United States Patent Office 2,921,637
Patented Jan. 19, 1960

2,921,637

BEET HARVESTER HAVING VIBRATING SEPARATING MEANS

Torsten Danielsson, Flen, Sweden, assignor to Aktiebolaget Överums Bruk, Overum, Sweden, a Swedish joint-stock company Application November 2, 1956, Serial No. 620,077

Claims priority, application Sweden November 3, 1955

1 Claim. (Cl. 171—101)

The invention relates to a beet harvesting machine of the kind which comprises two shares located side by side with an intermediate space decreasing backwards for loosening and raising beets, an endless conveyor chain located spaced at a distance behind the shares and comprising transversely extending rods with follower pins, guide bars pivotally connected with the rear bottom portions of the shares and resting with their rear portions freely upon said transverse rods for guiding the beets onto said conveyor chain and for removing soil from the guided beets thereby, that the bars are vibrated by the passing transverse rods, and above the shares and the guide bars a driven endless feed chain provided with follower pins.

An object of the invention is to prevent the beets from falling down on to the ground when passing the shares and the vibrating guide bars and effectively to convey them to the conveyor chain.

Figure 1:
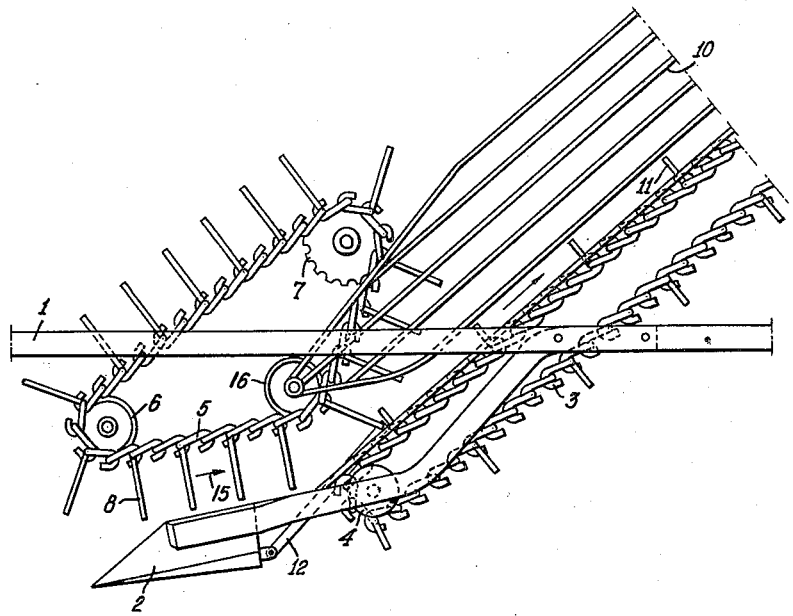
Figure 2:
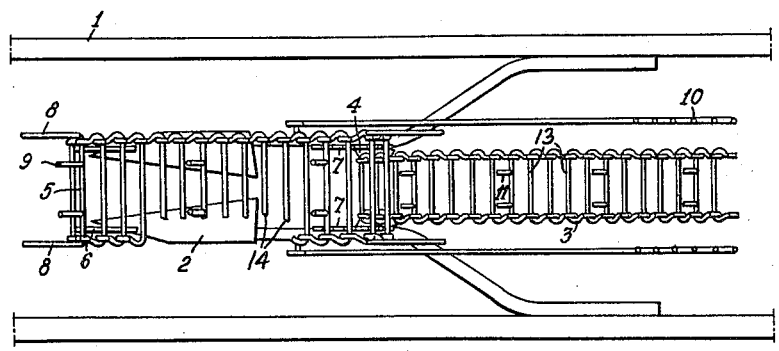

These and other objects and advantages will appear from the following description and the accompanying drawing, in which Figure 1 is a side view of a beet harvesting machine according to one form of the invention, and Figure 2 is a corresponding top plan view thereof with an upper portion broken away.

The two shares are, by means of two arms, rigidly connected to the frame work 1. The shares are located side by side with an intermediate space which decreases backwards, and have such a wedge form that the shares when passing through the soil at each side of a row of beets they force the soil between them together with the beets upwards. The beets are thereby loosened and can then easily be separated from the soil and conveyed further backwards in the machine.

For this purpose a rear endless conveyor chain 3 and an upper feed chain 5 are provided in the frame work. The conveyor chain 3 is passed over a lower chain guide roller 4 and a similar upper chain guide roller, not shown, which may be connected to the take-off of a towing tractor or to the travelling wheels of the harvesting machine. The guide roller 4 is located at a short distance behind the shares 2, and the upper part of the chain 3 moves backwards and upwards for the transport of the beets which thereby rest against pins 11 projecting from the chain. The chain is formed of transverse rods 13. Two guide bars 12 are pivotally connected with the rear bottom portion of the shares 2 and rest with their rear portions against the chain rods 13 in order that the vibrations of the bars caused by the rods will at least partly remove the soil from the beets during the transport of the beets up to the chain along the bars. In addition, the spaces between the chain rods allow soil and stones to fall down between the rods onto the ground.

The feed chain 5 is perferably also formed of transversal rods 14 and is passed over three guide rollers 6, 16 and 7, of which a fore roller 6 is located above the fore ends of the shares 2, next roller 16 is located above the guide bars 12 and the third upper roller 7 is a drive roller, which is connected to the power source. By the drive roller 7 the chain is driven with its lower portions backwards in the direction of the arrow 15 at a speed, which is greater than the speed of the harvesting machine. Between the rollers 6 and 16 the chain extends above and substantially parallel with the top edges of the shares and between the rollers 16 and 7 obliquely upwards. Between its opposite edges the feed chain has a series of follower pins 9, which advance the raised beets backwards along the shares and the guide bars 12. At its edges the chain carries series of guide pins 8, of which the pins have their downwards directed points passing near and outside respective shares and bars, which belong to the portion of the chain which passes between the guide rollers 6 and 16. The guide pins 8 prevent the beets from escaping laterally and falling down on to the ground from the shares and the vibrating bars 12.

For preventing the beets from falling down from the conveyor chain 3 the upturned portion of the chain forms the bottom of a channel having stationary side walls 10. Said side walls may be composed of longitudinally extending bars.

What is claimed is:

In a beet harvesting machine having two shares located side by side with an intermediate space decreasing in width rearwardly for loosening and raising beets, an endless conveyor chain located spaced at a distance rearwardly of said shares and comprising transversely extending rods provided with follower pins, guide bars pivotally connected with the bottom portions of the rear portions of said shares and resting with their rear portions freely upon said transverse rods for guiding the beets onto said conveyor chain and for removing soil from the guided beets, said removal of soil being facilitated by the action of said rods vibrating said bars in passing by said bars, three axles one of which is located forwardly of said shares, and another above said shares, guide rollers on said axles, an endless driven feed chain supported by said guide rollers, said guide rollers being located so that the one on said forward axles and the one on said axles above said shares guide the portion of said chain extending therebetween in a path above and substantially parallel with the top edges of said shares, said portion of said chain being driven rearwardly, and the portion of said chain extending between the guide roller on the axle above the shares and the roller on the third axle extending obliquely upwardly rearwardly, said feed chain, at its edges, having series of guide pins, of which the pins belonging to the portion of the chain, which is passing between the first-mentioned two rollers, have downwardly directed points located near the outside of respective shares and guide bars for preventing the beets from falling to the ground from the guide bars when the follower pins of the feed chain are advancing them towards the conveyor chain.

References Cited in the file of this patent

UNITED STATES PATENTS

| | | |
|---|---|---|
| 1,313,053 | Beard | Aug. 12, 1919 |
| 1,685,230 | Giberson | Sept. 25, 1928 |
| 2,452,418 | Zuckerman | Oct. 26, 1948 |

FOREIGN PATENTS

| | | |
|---|---|---|
| 48,632 | Denmark | Apr. 16, 1934 |